US008843077B2

(12) United States Patent (10) Patent No.: US 8,843,077 B2
Haran (45) Date of Patent: Sep. 23, 2014

(54) DYNAMIC RF MATRIX EMULATOR

(75) Inventor: Onn Haran, Bnei Dror (IL)

(73) Assignee: Autotalks Ltd., Kfar Netter (IL)

( * ) Notice: Subject to any disclaimer, the term of this patent is extended or adjusted under 35 U.S.C. 154(b) by 388 days.

(21) Appl. No.: 13/131,873

(22) PCT Filed: Nov. 19, 2009

(86) PCT No.: PCT/IB2009/055187
§ 371 (c)(1),
(2), (4) Date: Jun. 25, 2011

(87) PCT Pub. No.: WO2010/092444
PCT Pub. Date: Aug. 19, 2010

(65) Prior Publication Data
US 2011/0287721 A1 Nov. 24, 2011

Related U.S. Application Data

(60) Provisional application No. 61/152,272, filed on Feb. 13, 2009.

(51) Int. Cl.
*H04B 17/00* (2006.01)
(52) U.S. Cl.
CPC .................................. *H04B 17/009* (2013.01)
USPC .................... 455/67.11; 455/66.1; 455/115.1; 455/226.1
(58) Field of Classification Search
USPC ............ 455/66.1, 67.11, 67.12, 67.13, 67.14, 455/115.1, 226.1
See application file for complete search history.

(56) References Cited

U.S. PATENT DOCUMENTS

| 7,349,670 | B2 | 3/2008 | Mlinarsky et al. | |
| 7,809,404 | B2* | 10/2010 | Daniels et al. | 455/562.1 |
| 2006/0084429 | A1* | 4/2006 | Buvaneswari et al. | 455/424 |
| 2006/0229018 | A1* | 10/2006 | Mlinarsky et al. | 455/67.11 |

FOREIGN PATENT DOCUMENTS

WO WO/2010/092444 8/2010

OTHER PUBLICATIONS

Guillermo Acosta-Marum; Mary Ann Ingram, "Six time and frequency selective empirical channel models for vehicular wireless LANs", IEEE Vehicular Technology Magazine, Dec. 2007, pp. 4-11.
PCT International Search Report, Mar. 15, 2010.

* cited by examiner

*Primary Examiner* — Ping Hsieh
(74) *Attorney, Agent, or Firm* — Nathan & Associates Patent Agents Ltd.; Menachem Nathan

(57) ABSTRACT

A dynamic RF matrix emulator uses digital switching to emulate the switching behavior of hundreds of wireless terminals. The emulator includes a switching matrix with channels formed between terminal pairs, digital front ends for coupling terminals digitally to the switching matrix, and a channel database having entries representing attenuation values which can be changed in time, the attenuation values correlated with movement of vehicles provided by a traffic simulator. Channel behavior is defined by temporal attenuation values obtained from the database. The digital switching is controlled through a digital communication protocol.

14 Claims, 6 Drawing Sheets

DYNAMIC RF MATRIX EMULATOR

CROSS REFERENCE TO RELATED APPLICATIONS

This invention claims priority from U.S. Provisional Patent Application No. 61/152,272 filed 13 Feb. 2009, the content of which is incorporated herein by reference.

FIELD OF THE INVENTION

The invention disclosed herein relates in general to testing of wireless networks or devices and more specifically to systems and methods for emulating wireless networks with large numbers of radio frequency (RF) units (also referred to as "RF terminals").

BACKGROUND OF THE INVENTION

The task of testing wireless networks or devices containing many RF terminals ("terminals") imposes great challenges. Any two terminals can communicate through a wireless communication channel. As opposed to cellular phone testing, in which the communication is limited between a terminal and a centralized base-station, the requirement here is for full switching between all terminals. In the case of mobile terminals (for example installed in vehicles) where communication channels experience temporally and spatially changing environments, such testing becomes even more challenging. A terminal may also be referred to as "device under test" (DUT).

RF emulators can support, at very high cost, RF switching between a very limited number of terminals, but cannot provide full matrix switching for large numbers of terminals. The number of required terminal pairs for N terminals, assuming half-duplex operation, is $(N-1)^2$. For example, 3 terminals require 4 pairs, 100 terminals require 9801 pairs, and 200 terminals require 39,601 pairs for full switching. There is no RF-based implementation (RF channel based testing) that can come even close to emulate such large networks. Known RF channel based testing does not consider the location of terminals and the variation in such location. Switching is typically set once throughout a test period, meaning the terminals are considered fixed.

In view of the inherent limitations of known RF-based emulators which use RF based channel testing, there is a need for and it would be advantageous to have RF emulation systems and methods capable of handling networks with many (e.g. hundreds of) terminals.

SUMMARY OF THE INVENTION

The invention discloses a dynamic RF matrix emulator ("emulator") used to validate behavior and test overall performance of large wireless networks, which may include hundreds of wireless terminals. In some embodiments, the terminals may be mobile (as in vehicles). A mobile terminal's location may change during a test period, varying the attenuation in the channel between it and another terminal. In one aspect different from that of known art, a dynamic RF matrix emulator of the invention uses digital switching instead of RF switching. In this description, "digital switching" involves the use of a digital protocol (e.g. an Ethernet-like protocol defined by IEEE802.3) to frame the data transferred between a terminal and the switching matrix. Note that the Ethernet-like protocol is used for example only, and that many other digital protocols may be used for the digital switching of the invention. "Dynamic" refers to temporally-changing assignations of database entries representing channel attenuation to a channel. It also refers to the switching matrix, in the sense that it can be changed during testing and in real-time.

According to the invention, there is provided an apparatus for testing wireless terminals comprising a switching matrix coupled through a first plurality of M digital front end modules to a second plurality of N RF terminals, the switching matrix having channels and a channel database for providing temporal channel attenuation data, wherein the switching matrix, the terminals and the channel database are interconnected digitally and wherein the channel attenuation data is used for setting switching decisions.

In an embodiment, M is equal to N

In an embodiment, M is not equal to N.

In an embodiment, the channel database includes a storage element for storing database entries which represent channel attenuation values (or simply "channel attenuation"), a loading interface for enabling loading of the database entries into the storage element, a synchronization control element which serves as a timing element for controlling a current database entry and a retrieval interface for providing a current database entry to a channel.

In an embodiment, each database entry is based on a current terminal location.

In an embodiment, the switching matrix includes M input parameter extractor modules used for parsing an incoming bit stream to obtain a transmitted power and data rate, and M output selector modules used for selecting data received from transmitters and for digitally connecting the terminals.

In an embodiment, N>3.

In an embodiment, the digital interconnection is enabled by use of a digital connectivity protocol.

In an embodiment, the terminals are mobile.

In an embodiment, the digital connectivity protocol is the IEEE 802.3 protocol.

In an embodiment, a terminal includes a plurality of physical layer (PHY) modem chains.

According to the invention, there is provided an apparatus for testing wireless terminals comprising a switching matrix digitally connectable to a plurality of RF terminals and temporally configurable with digital channel attenuation values, the switching matrix operative to dynamically provide switching decisions.

In an embodiment, the switching matrix is digitally connectable using a digital communication protocol.

In an embodiment, the digital attenuation values are based on a channel model. According to the invention, there is provided a method for testing wireless RF terminals comprising the steps of providing a dynamic RF matrix emulator which includes a switching matrix, a channel database and M digital front ends; connecting N terminals through respective digital front ends across the switching matrix, a connection between two terminals forming a channel; and emulating the behavior of terminals through digital switching of the switching matrix to set switching decisions.

In an embodiment, the step of emulating includes providing temporally changing attenuation values per channel.

In an embodiment, the method further comprises the step of preparing the channel database offline.

In an embodiment, the step of preparing the channel database offline includes using a driving simulator to provide locations of terminals and a surrounding map, calculating a channel model to obtain a current database entry for a channel, the entry including an attenuation value, quantizing the attenuation value to a quantized attenuation value, and writing the quantized value to a storage element in the channel database.

In an embodiment, the quantizing includes using a maximal quantization step less than half the minimum sensitivity of a terminal PHY modem.

In an embodiment, the step of emulating includes identifying terminals with a winner transmitter and a runner up transmitter, and comparing a difference in receive powers of the winner and runner up transmitters with a threshold to determine a switching decision.

BRIEF DESCRIPTION OF THE DRAWINGS

For a better understanding of the present invention and to show more clearly how it could be applied, reference will now be made, by way of example only, to the accompanying drawings in which.

DETAILED DESCRIPTION OF THE INVENTION

Figure 1:
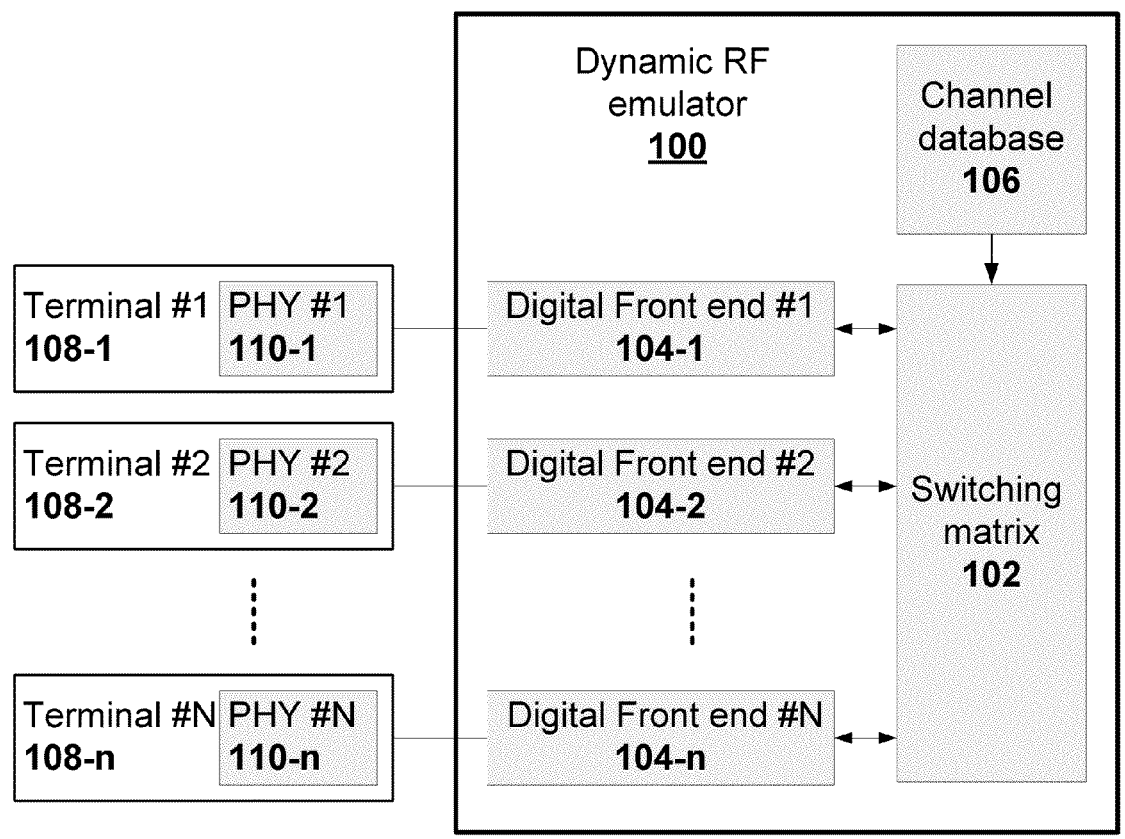
FIG. 1 shows an embodiment of an apparatus for testing wireless networks or devices according to the invention.

FIG. 1 shows an embodiment 100 of a dynamic RF emulator according to the invention. The description is given in detail for moving terminals, for example positioned in vehicles. However, it should be understood that the description is equally valid for cases in which some or all of the terminals are static. One inventive aspect of a dynamic RF emulator of the invention is that its concept of operation is based on digital switching instead of RF switching. That is, the emulation uses digital signals instead of (analog) RF signals to perform basic RF channel emulation in a digital manner. This is in contrast with known art, e.g. that disclosed in U.S. Pat. No. 7,349,670. Further in contrast with architectures and methods based on RF signal switching, the digital switching is changed based on configuration, using known current vehicle (terminal) locations and channel attenuations calculated from a RF channel model. Channel models which can be used in the invention are known, see e.g. Mary Ann Ingram, "Six time and frequency selective empirical channel models for vehicular wireless LANs", IEEE Vehicular Technology Conference, Fall 2007. The location of the terminals, which changes with time following a vehicle driving model, is considered in the channel properties. Driving models which can be used in the invention are known. Such models model usually traffic in a real city, see for example the iTetris project, which simulated the entire city of Bologna, Italy with "Sumo".

Emulator 100 includes a dynamic switching matrix 102, a plurality of N digital front ends 104-1 to 104-n and a channel database 106, interconnected as shown. Emulator 100 may be connected through a digital front end 104 to a RF terminal 108. FIG. 1 shows N terminals 108-1 to 108-n, connected to N digital front ends 104-1 to 104-n In general, the number of terminals may be different from the number of front ends. That is, while each terminal must have a front end partner in the switching matrix, a front end may be unconnected to a terminal when the switching matrix is not fully populated.

Matrix 102 provides switching between all terminal pairs during an emulation "run" (done in real-time or "online"). That is, matrix 102 can connect any terminal to any other terminal through a channel to provide up to $(N-1)^2$ emulated channels. As mentioned, in the particular example where N=200, there are $199^2$ possible emulated channels. The switching is controlled digitally, for example by a computer (e.g. PC). The computer also loads information to the channel database. Channel database 106 and switching matrix 102 are described in more detail with reference to, respectively, FIG. 3 and FIG. 4. Each terminal 108-1 to 108-n includes at least one PHY modem 110-1 to 110-n. The PHY functionality is annulled and not tested during the emulation, but its performance parameters, such as a threshold of detecting data from noise, are carefully emulated. All other terminal elements are tested without any modification. Optionally, one may replace the digital front ends 104 with complete PHY modems, and not bypass them. In this case, an RF cable must be used to connect two terminals, and the number of terminals would be limited due to size constraints.

The channel database is a database of temporal (time-varying) channel attenuation values for all channels and is prepared for a specific emulation scenario. The attenuation values may be obtained in a pre-run, offline procedure, using a channel model. Each RF channel is considered to be semi-static, as configured in the channel database. Optionally, one may define a RF channel to be fully dynamic, although the increased complexity will likely not justify the gain from the increased emulation accuracy.

The channel model calculation is performed periodically. For example, the channel model for any time between 0 and 100 msec will be fixed if the channel model period is set to 100 msec. For each database entry, a channel acts (has one type of behavior in terms of attenuation properties) in a fixed manner. For example, a channel acts one way for a database entry of 40 dB attenuation and another way for a database entry of 44 dB attenuation.

The digital front ends connect the emulator to respective terminals in a digital manner. The move to digital switching, instead of RF switching, allows scale-up of the operation and can support a very high number of terminals (e.g. 200 terminals as in the example above), providing one significant advantage of the invention over RF switching based emulations.

Figure 2:
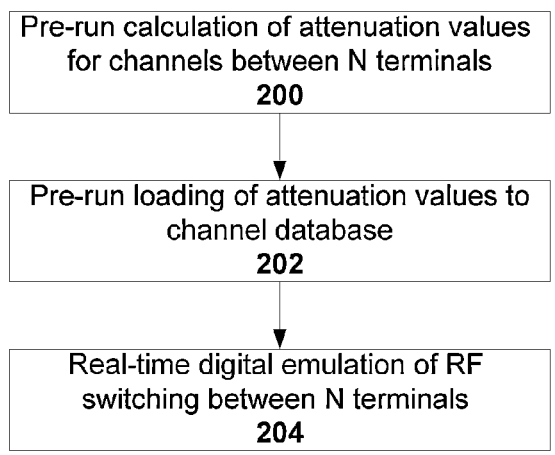
FIG. 2 shows the main steps of a method for testing wireless networks or devices according to the invention.

FIG. 2 shows the main steps of an emulation method according to the invention. A pre-run process of building the channel database entries is performed once for each driving scenario in step 200. This process results in calculated attenuation values for all channels. These values are loaded to the emulator channel database in step 202. A digital emulation in real-time is then performed by the emulator in step 204. The emulation enables multiple terminals to communicate with each other as if those terminals were driving in a designed driving scenario, by providing switching decisions.

In case of a driving scenario with a small number of vehicles and very high computational capacity, the pre-run processing might be shorter than an update period (100 msec for example). In this case, real-time operation of steps 200 and 202 is possible, avoiding the need for a pre-run.

Figure 3:
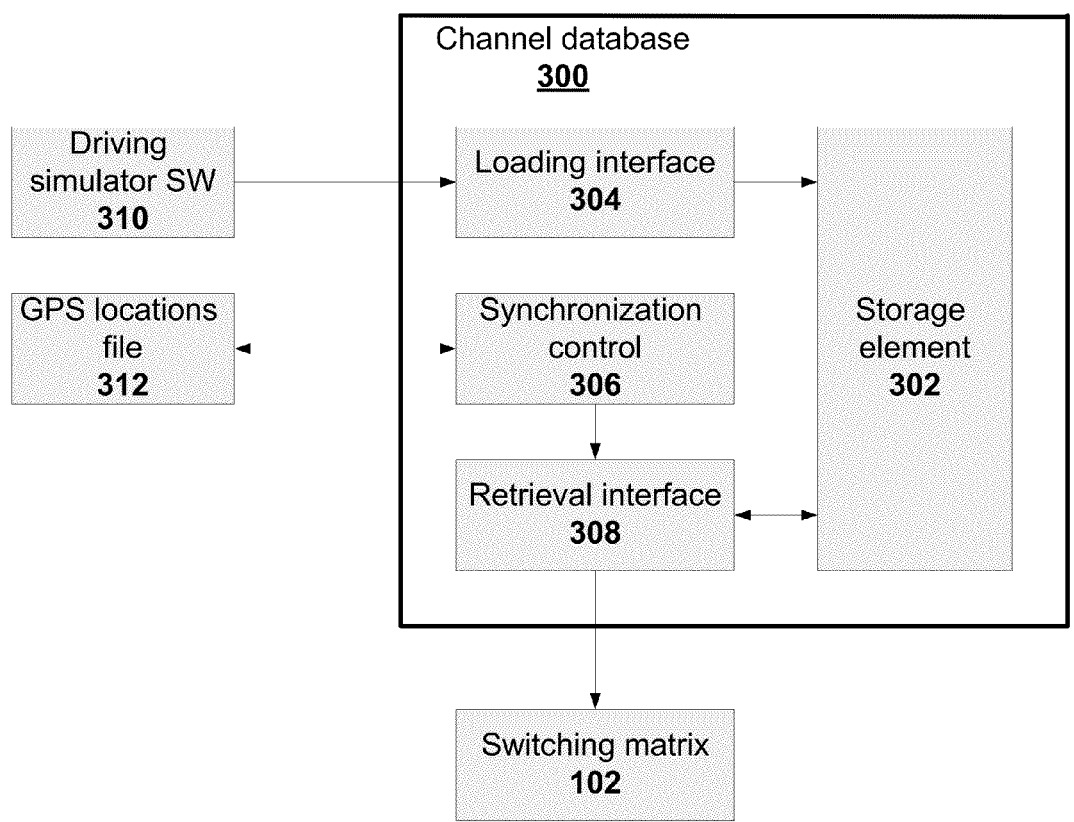
FIG. 3 shows details of a channel database in the apparatus of FIG. 1.

FIG. 3 shows a block diagram which provides details of channel database 106. The channel database includes a storage element 302 for storing database entries; a loading interface 304 for interfacing the channel database with a driving simulator software 310 and for enabling loading of the database entries into the storage element; a synchronization control element 306, which serves as a timing element for controlling the database entry in use (also referred to as "current database entry") and for providing an emulation "begin" event for achieving network synchronization of all the terminals connected to the matrix (from, exemplarily, a GPS location file 312); and a retrieval interface 308 for providing the current database entry to each channel.

The amount of memory in the storage element should suffice for the required operation. For example, there may be a requirement to store a total of 200M channels to support 1000 seconds of emulation in a 200 terminal network while updating a database entry every 100 msec, and for the switching matrix to switch 39601 channels.

The following example is given to illustrate the need for synchronization control. In an exemplary vehicular communication application, a new database entry is retrieved once every 100 msec, to properly reflect vehicle movement. The timing element must synchronize the emulation start with other testing operations (such as file reading to provide an input). For example, side information, such as GPS location, should match precisely the present channel attenuation value obtained from the channel database entry. To achieve that, the element distributing the GPS information (e.g. GPS location file 312) should be synchronized with the channel database.

Figure 4:
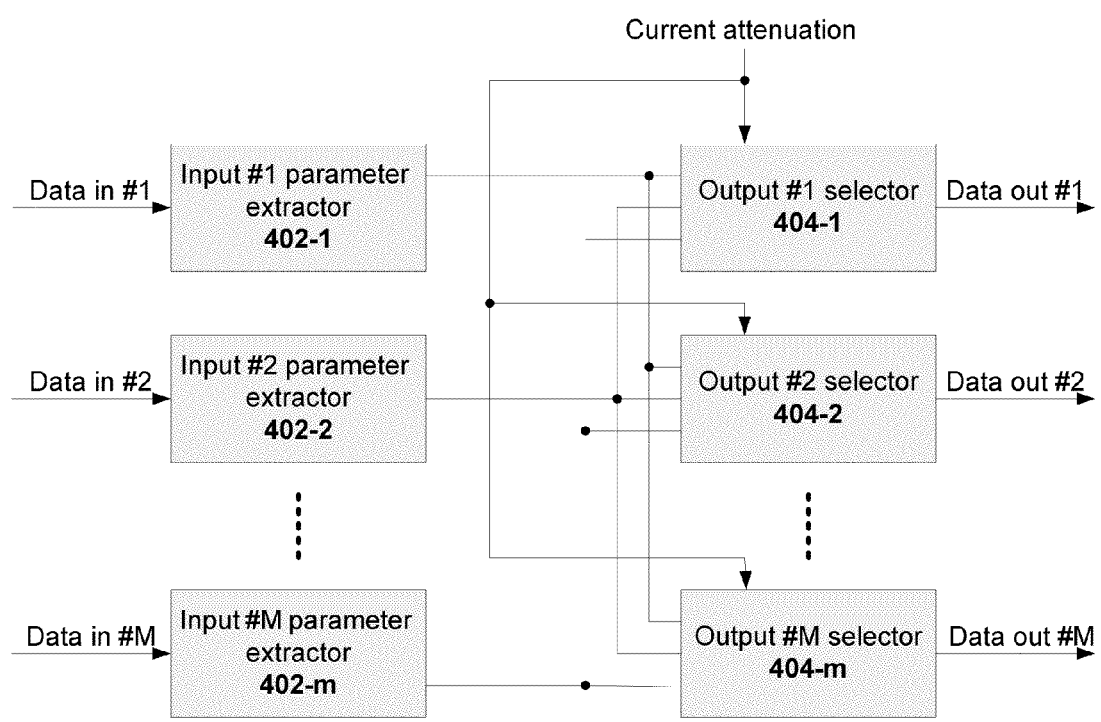
FIG. 4 shows details of a switching matrix in the apparatus of FIG. 1.

Switching matrix 102 is described in more detail with reference to FIG. 4. The switching matrix includes M input parameter extractor modules 402-1 to 402-*m* and M output selector modules 404-1 to 404-*m*, interconnected as shown. Each extractor module can parse specific fields from a bit stream. Each selector module can select the data received by its respective receiver from all transmitters. FIG. 4 shows that each module 402 is connected to each module 404. The interconnection scheme is shown for 3 terminals for simplification (and in this case, M=N=3). The interconnection of N>3 terminals would be similar. The parameter extractor modules receive input streams from respective front ends 104-1 to 104-*n*. Each input stream includes a transmitted RF power level and a data rate in addition to data. The transmitted data rate is included in an IEEE 802.11 packet header, so it can be parsed from the packet. The information on the power level is not part of the header, and it has to be added artificially to the data stream to identify the transmitted power for later calculations. This can be done for example by having the transmitter add a byte before the original data stream, the added byte representing the transmitted power. The added byte is removed by the parameter extractor module and does not reach the destination terminals.

The switching matrix can support single RF channel switching or multiple RF channel switching. "Multiple channels" implies multiple bit streams. "Multiple" also refers to more than one PHY modem chain in a terminal. In multiple RF channel switching, one digital front end handles more than one channel, i.e. multiplexes two channels on the same interface. That is, the switching element is duplicated, with two output selector modules.

The parameter extractor modules parse the side information (i.e. the added byte mentioned above) and determine if a terminal transmitter is active or not. The determination of whether the transmitter is active or inactive depends on the digital protocol used between the terminals and the matrix. For example, for an Ethernet-like protocol, the determination relies on Ethernet commas to indicate an idle channel.

The switching needs to consider the data rate. Wireless protocols have the ability to support various data rates. For example, if the emulation uses the IEEE 802.11p protocol, the data rate can vary between 3 Mbps to 27 Mbps. The emulator supports switching at all the potential rates of the RF transmission power. The data rate indication may be in-band or out-of-band of the data stream. Each selector module determines independently of others if a respective output port of selector modules 404-1 to 404-*m* is idle, if it receives data from a specific input port, or if its faces a collision, implying reception of corrupted data. "Corrupted data" may be any data that does not represent a legal packet. For example, it can be a packet with a bad CRC (bad validity indication) or one using error codes with an Ethernet-like protocol. The output selectors use the current attenuation value for the emulated channel derived from database. This value is provided by a respective database entry in the channel database.

The switching matrix includes a plurality of parallel decision units (selector modules 404) to achieve a fast decision time. The time required for complete scanning of all terminals, which could number in the hundreds, should be shorter than a carrier sense delay of a device under test (DUT), which is on the order of 2-3 μsec for 802.11p devices.

Figure 5:
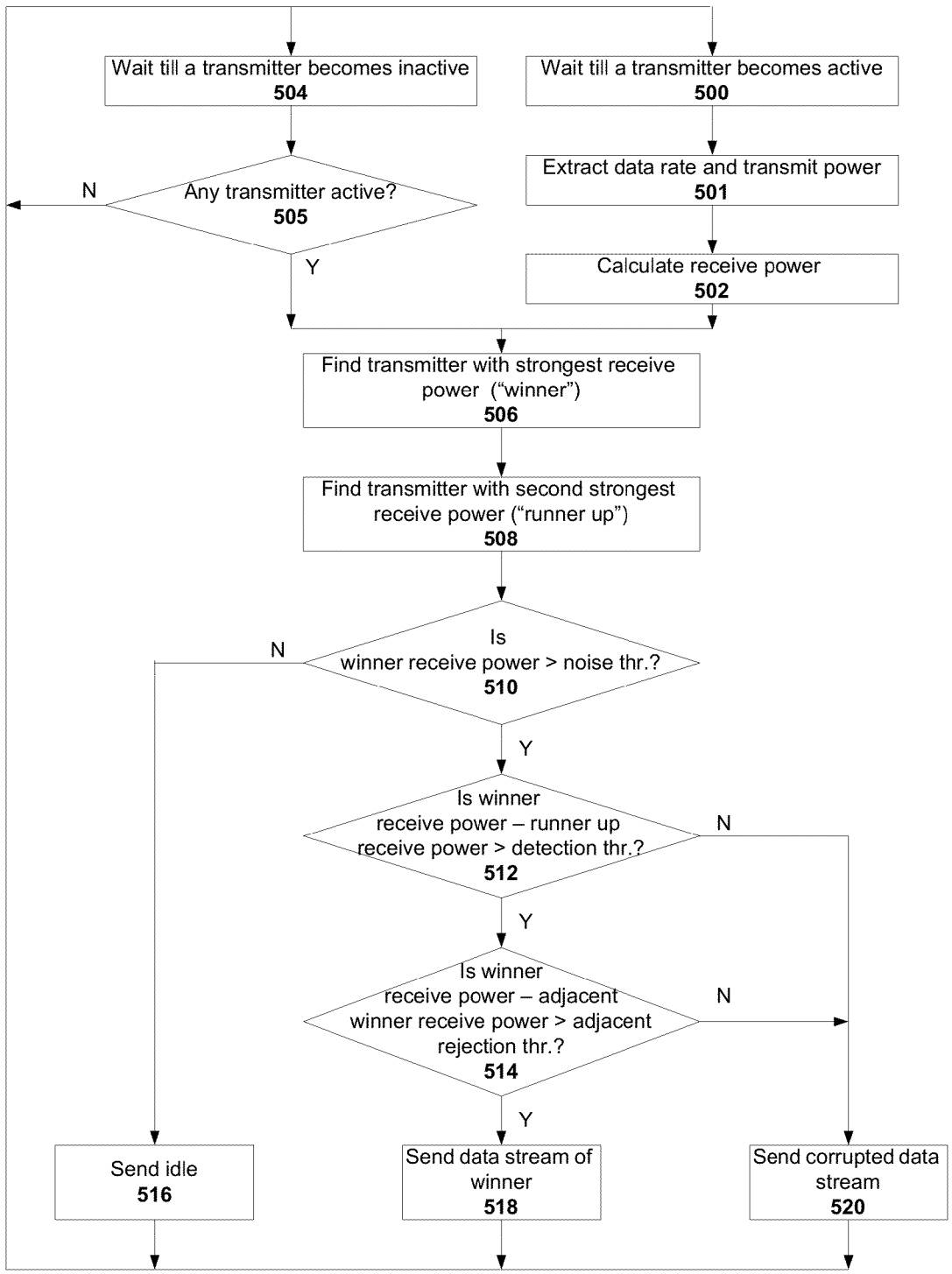
FIG. 5 provides details of a real-time emulation run.

FIG. 5 provides details of a real-time emulation run (step 204). In step 500, the parameter extractor modules wait until a transmitter becomes active. When a transmitter becomes active, the extractor modules become active and in step 501 provide the rate and transmitted power of the active transmitter. The receive power of a receiver (equal to the transmit power—attenuation) is calculated in step 502. The calculation is performed by subtracting the attenuation, taken from the channel database, from the transmitted power. The transmitter with the strongest receive power (also referred to as "winner") is selected in step 506. The transmitter with the second strongest receive power (also referred to as "runner up") is selected in step 508 by a respective output selector module.

In step 510, the power of the winner is compared with a noise threshold. The noise threshold indicates the ability of the receiver to detect the signal, and is determined by standardization. It is fixed for all modulations, and for example in IEEE 802.11p is set to −85 dBm. Any transmission below the noise threshold, which causes a NO selection in step 510, will cause idle transmission in step 516. This functionality emulates carrier sense.

In step 512, the difference between the power of the winner and the power of the runner up is compared with a "reception" threshold per data rate of the winner (which is a configurable threshold determined based on the PHY modem. For example, a 802.11p PHY modem has a known performance per each data rate. If the comparison indicates an insufficient power difference (i.e. lower than the threshold), then a corrupted data stream is transmitted in step 520. Otherwise, a second check is performed in step 514. In this check, the difference between the power of the winner minus the channel attenuation and the receive power of the winner of an adjacent channel is compared with an "adjacent channel rejection" threshold, which is set per data rate of the winner (for example, 16 dB for QPSK and 19 dB for BPSK). This threshold indicates the level of rejection, which is typically 16 dB, but which can be enhanced to 32 dB. In case of interference from an adjacent channel, as indicated by a NO in step 514, a corrupted data stream is transmitted in step 620. Otherwise, data is transmitted correctly from the winner to the terminal associated with the respective selector module in step 518.

The actions in steps 516, 518 and 520 continue until the conditions of either step 500 or 504 are met. That is, they continue until a new transmitter becomes active, or until one of the active transmitters become inactive. The check of the latter case is performed in step 504. A check if any transmitter is active is performed in step 505 as a condition for advancing to step 506. If no transmitter is active, the operation waits in step 500 until a transmitter becomes active.

The comparison of only two transmitters (a winner and a runner up) to determine if the winner should be received correctly by the terminal associated with the respective selector module reduces significantly the complexity of operation. However, such comparison is optional, and one may alternatively sum up the receive powers of all runner ups. Note also that in steps 500 and 504 the operation is performed only when a transmitter state changes from active or inactive, instead of using a comparison per bit. In an alternative embodiment, steps 500 and 504 may be optional, and one may perform comparison per bit instead.

Figure 6:
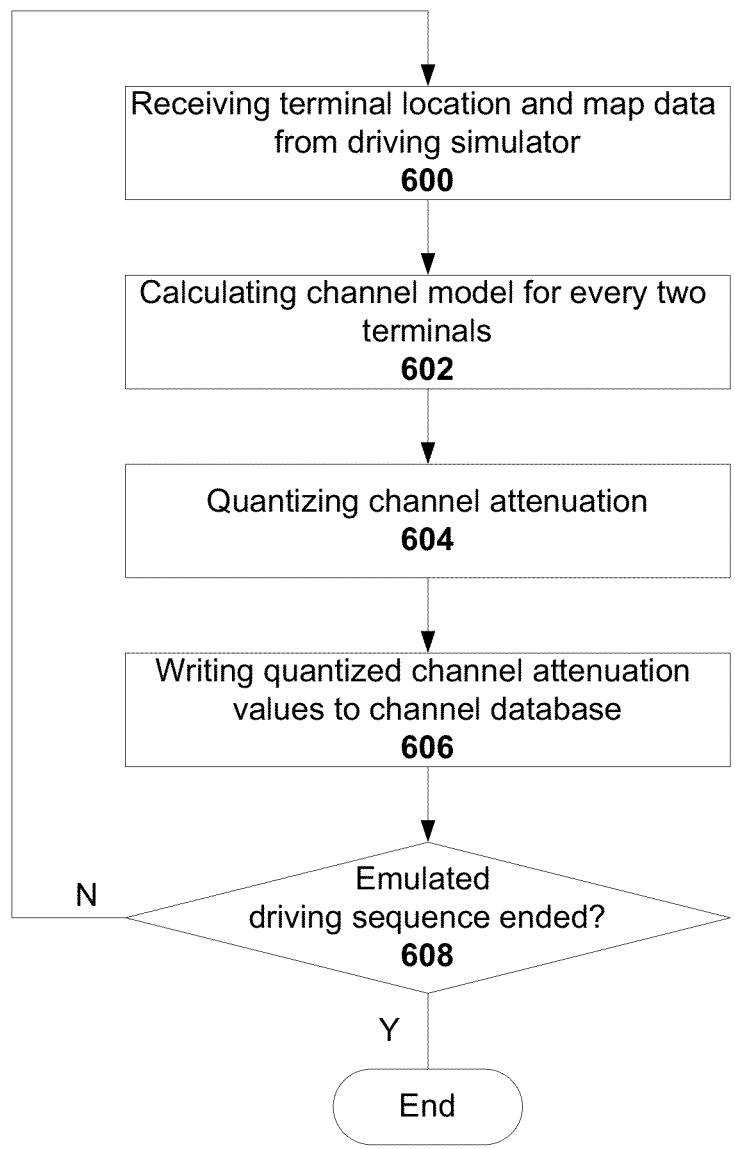
FIG. 6 describes a channel database creation process in a method of the invention.

The process of preparing the channel attenuation database (step 200) is described in more detail with reference to FIG. 6. A microscopic driving simulator (which describes precisely the location of each vehicle, (see. e.g. the "Sumo" simulator developed by the German Aerospace Center) provides the location of all emulated terminals and a surrounding map in step 600. In step 602, the RF channel model is calculated for each channel. The RF channel model considers the distance between the terminals and physical obstructions (line-of-sight in case of no obstruction, and non-line-of-sight otherwise). In step 604, the channel attenuation obtained from a channel database entry is quantized to a small number of bits (e.g. to bits having a resolution of 4 dB). The quantization combines the ability to perform power-based decisions with the simplification of the decision process. The maximal quantization step is preferably less than half of minimum sensitivity of a PHY modem, which represents the ability of the modem to correctly distinguish signals from noise. For example, the use of 4 dB resolution quantization steps is driven by a 8 dB threshold.

The quantized values are written in step 606 to storage element 302 using loading interface 304. In step 608, a check is performed to see if the driving simulation scenario ended. If yes, the operation is completed, and step 202 of loading the database may begin If not, operation is repeated from step 300.

EXAMPLES

An example for a switching decision is provided for a single output and for just 16 inputs. The full matrix repeats this calculation for all outputs and hundreds on inputs. The attenuation vector (database entry for an output selector) is as follows: {Open, 8 dB, 16 dB, 16 dB, 8 dB, Open, Open, Open, 32 dB, 32 dB, 8 dB, Open, Open, 24 dB, Open, Open}.

Assume that the list of the current state of all transmitters, decided in an arbitrary fashion based on current transmissions of terminals using a procedure as in FIG. 5 step 500, is {10 dBm, No, No, No, No, No, 20 dBm, No, No, 10 dBm, No, No, No, No, No, No}. The listed values indicate transmitter power. In this list, there are 3 active transmitters (#1, 7 and 10). Of these, the channels of $1^{st}$ and $7^{th}$ transmitters are open and not impacting. Therefore, the $10^{th}$ transmitter is the only one considered and transmitted as is if its power is higher than the SNR.

If the $4^{th}$ input suddenly starts to transmit using 10 dBm output power, then it is stronger than the existing $10^{th}$ input transmission, because the $4^{th}$ input has 16 dB attenuation while the $10^{th}$ input has 32 dB attenuation. This means that a 16 dB SNR is required to correctly receive the data. If the modulation requires less than a 16 dB reception threshold, such as QPSK, then the $4^{th}$ input (with the lower attenuation) will be transmitted as is. If the reception threshold is higher, for example for QAM64, then corrupted data will be transmitted.

An example for channel database preparation is provided for two vehicles. Real-life examples manage a significantly higher number of vehicles, and the same rules explained here are repeated for all vehicles in the environment. Assume that the two vehicles drive in opposite directions on the same road, each at a speed of 90 km/h. The initial distance is 1000 meters. At this distance, there is no connectivity channel between the two vehicles, i.e. the attenuation is too high to allow signal detection, and the database entries indicate no connection (using for example a special "open" flag). After 4 seconds, the distance between the vehicles is 800 meters, and the attenuation is very high, around 90 dB. Assume that the channel database updates every 100 msec. During this period, the distance between the two cars is reduced by 5 meters and the new channel attenuation is calculated according to the new (current) distance. The calculation is valid for the entire 100 msec, meaning all the locations of the vehicles between 800 and 795 meters apart will have the same attenuation. Based on the used channel model, the closer the vehicles get, the lower the attenuation. When the vehicles get to be very close, the attenuation is minimal, and can reach for example 30 dB. After that, the vehicles pass each other, continue to drive in the opposite direction, and the distance between them increases, increasing the attenuation accordingly.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

The invention claimed is:

1. An apparatus for testing wireless terminals comprising:
    a) a switching matrix coupled through a first plurality of M digital front end modules to a second plurality of N radio frequency (RF) terminals, the switching matrix having channels; and
    b) a channel database for providing temporal channel attenuation data, wherein the channel database includes:
        i. a storage element for storing database entries which represent channel attenuation values,
        ii. a loading interface for enabling loading of the database entries into the storage element,
        iii. a synchronization control element which serves as a timing element for controlling a current database entry, and
        iv. a retrieval interface for providing a current database entry to a channel;
        wherein the switching matrix, the terminals and the channel database are interconnected digitally and wherein the channel attenuation data is used for setting switching decisions.

2. The apparatus of claim 1, wherein M is equal to N.

3. The apparatus of claim 2, wherein a database entry is based on a current terminal location.

4. The apparatus of claim 1 wherein M is not equal to N.

5. The apparatus of claim 1, wherein N>3.

6. The apparatus of claim 5, wherein the digital connectivity protocol is the IEEE 802.3 protocol.

7. The apparatus of claim 1, wherein the digital interconnection is enabled by use of a digital connectivity protocol.

8. The apparatus of claim 1, wherein the terminals are mobile.

9. The apparatus of claim 1, wherein a terminal includes a plurality of PHY modem chains.

10. An apparatus for testing wireless terminals comprising:
   a) a switching matrix coupled through a first plurality of M digital front end modules to a second plurality of N radio frequency (RF) terminals, the switching matrix having channels, and including;
      i. M input parameter extractor modules used for parsing incoming bit streams to obtain a transmitted power and data rate, and
      ii. M output selector modules used for selecting data received by from transmitters and for digitally connecting the terminals, and
   b) a channel database for providing temporal channel attenuation data;
   wherein the switching matrix, the terminals and the channel database are interconnected digitally and wherein the channel attenuation data is used for setting switching decisions.

11. A method for testing wireless RF terminals comprising the steps of:
   a) providing a dynamic RF matrix emulator which includes a switching matrix, a channel database and M digital front ends;
   b) connecting N terminals through respective digital front ends across the switching matrix, a connection between two terminals forming a channel;
   c) emulating the behavior of terminals through digital switching of the switching matrix to set switching decisions based on channel database entries; and
   d) preparing the channel database offline, by:
      i. using a driving simulator to provide locations of terminals and a surrounding map,
      ii. calculating a channel model for each channel to obtain a current database entry, the entry including an attenuation value,
      iii. quantizing the attenuation value to obtain a quantized attenuation value, and
      iv. writing the quantized value to a storage element in the channel database.

12. The method of claim 11, wherein the step of emulating includes providing temporally changing attenuation values to a channel.

13. The method of claim 11, wherein the quantizing includes using a maximal quantization step less than half the minimum sensitivity of a terminal PHY modem.

14. A method for testing wireless RF terminals comprising the steps of:
   a) providing a dynamic RF matrix emulator which includes a switching matrix, a channel database and M digital front ends;
   b) connecting N terminals through respective digital front ends across the switching matrix, a connection between two terminals forming a channel; and
   c) emulating the behavior of terminals through digital switching of the switching matrix to set switching decisions, wherein the step of emulating includes identifying terminals with a winner transmitter and a runner up transmitter, and comparing a difference in receive powers of the winner and runner up transmitters with a threshold to determine a switching decision.

* * * * *